(12) United States Patent
Heo et al.

(10) Patent No.: US 8,158,025 B2
(45) Date of Patent: Apr. 17, 2012

(54) PHOSPHOR COMPOSITION AND DISPLAY DEVICE INCLUDING THE SAME

(75) Inventors: Gyeong-Jae Heo, Suwon-si (KR);
Mi-Ran Song, Suwon-si (KR);
Young-Hun Lee, Suwon-si (KR);
Yoon-Chang Kim, Suwon-si (KR);
Yong-Chan You, Suwon-si (KR);
Do-Hyung Park, Suwon-si (KR);
Hyun-Deok Lee, Suwon-si (KR);
Seon-Young Kwon, Suwon-si (KR);
Ji-Hyun Kim, Suwon-si (KR); Ick-Kyu Choi, Suwon-si (KR); Ji-Hyun Kim, Suwon-si (KR); Yu-Mi Song, Suwon-si (KR); Jay-Hyok Song, Suwon-si (KR); Min-Ju Kim, Suwon-si (KR); Sun-Hwa Kwon, Suwon-si (KR); Young-Ki Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 516 days.

(21) Appl. No.: 12/320,764

(22) Filed: Feb. 4, 2009

(65) Prior Publication Data

US 2009/0194740 A1 Aug. 6, 2009

(30) Foreign Application Priority Data

Feb. 5, 2008 (KR) .................. 10-2008-0011857

(51) Int. Cl.
*C09K 11/08* (2006.01)

(52) U.S. Cl. .... 252/301.4 R; 252/301.6 R; 252/301.6 F; 313/486; 313/487

(58) Field of Classification Search ........... 252/301.4 R, 252/301.6 F, 301.6 R; 313/486, 487
See application file for complete search history.

(56) References Cited

U.S. PATENT DOCUMENTS 7,077,978 B2 * 7/2006 Setlur et al. ............ 252/301.4 R
2006/0163999 A1 * 7/2006 Murazaki et al. ............. 313/485

FOREIGN PATENT DOCUMENTS

JP 2001-303047 A 10/2001

* cited by examiner

*Primary Examiner* — Carol M Koslow
(74) *Attorney, Agent, or Firm* — Lee & Morse, P.C.

(57) ABSTRACT

A phosphor composition including a first phosphor represented by Formula 1:

$$Ba_{1-b}Mg_{1-a}Al_{10}O_{17}:Mn_a,Eu_b \qquad (1).$$

In Formula 1, a and b satisfy the relations: $0.05 \leq a \leq 0.4$, and $0.006 \leq b < 0.05$.

19 Claims, 6 Drawing Sheets

Table 2: Decay time, Color coordinate, and Relative luminance

|  | Phosphor composition (weight ratio) | | Relative Luminance (%) | CIE color coordinate | | Decay time (ms) |
|---|---|---|---|---|---|---|
|  | First phosphor | Second phosphor | | x | y | |
|  | $Ba_{1-b}Mg_{1-a}Al_{10}O_{17}:Mn_a,Eu_b$ | $(Y_{1-x-y}Gd_xTb_y)Al_3(BO_3)_4$ | | | | |
| Comparative Example 4 | - | - | 100 | 0.327 | 0.612 | 9 |
| Comparative Example 5 | 0 | 100 | 110 | 0.337 | 0.587 | 5.5 |
| Example 3 | 100 | 0 | 95 | 0.137 | 0.626 | 2.6 |
| Example 5 | 80 | 20 | 98 | 0.177 | 0.618 | 3.1 |
| Example 6 | 60 | 40 | 101 | 0.217 | 0.610 | 3.6 |
| Example 7 | 40 | 60 | 104 | 0.257 | 0.603 | 4.0 |
| Example 8 | 20 | 80 | 107 | 0.297 | 0.595 | 4.5 |

Table 1: Decay time, Color coordinate, and Relative luminance

| | Phosphor | Decay time | CIE x | CIE y | Relative Luminance |
|---|---|---|---|---|---|
| Comparative Example 1 | $Ba_{1-b}Mg_{1-a}Al_{10}O_{17}:Mn_a,Eu_b$ (a=0.08 and b=0) | 15 ms | 0.1351 | 0.7506 | 100% |
| Comparative Example 2 | $Ba_{1-b}Mg_{1-a}Al_{10}O_{17}:Mn_a,Eu_b$ (a=0.08 and b=0.005) | 11.8 ms | 0.1342 | 0.7378 | 101% |
| Comparative Example 3 | $Ba_{1-b}Mg_{1-a}Al_{10}O_{17}:Mn_a,Eu_b$ (a=0.08 and b=0.05) | 0.1 ms | 0.136 | 0.485 | 90% |
| Example 1 | $Ba_{1-b}Mg_{1-a}Al_{10}O_{17}:Mn_a,Eu_b$ (a=0.08 and b=0.15) | 5 ms | 0.1347 | 0.6771 | 100% |
| Example 2 | $Ba_{1-b}Mg_{1-a}Al_{10}O_{17}:Mn_a,Eu_b$ (a=0.08 and b=0.02) | 4.8 ms | 0.1373 | 0.6725 | 98% |
| Example 3 | $Ba_{1-b}Mg_{1-a}Al_{10}O_{17}:Mn_a,Eu_b$ (a=0.08 and b=0.025) | 2.6 ms | 0.137 | 0.6257 | 99% |
| Example 4 | $Ba_{1-b}Mg_{1-a}Al_{10}O_{17}:Mn_a,Eu_b$ (a=0.08 and b=0.03) | 1.1 ms | 0.136 | 0.596 | 96% |

FIG. 4

Table 2: Decay time, Color coordinate, and Relative luminance

| | Phosphor composition (weight ratio) | | Relative Luminance (%) | CIE color coordinate | | Decay time (ms) |
|---|---|---|---|---|---|---|
| | First phosphor | Second phosphor | | x | y | |
| | $Ba_{1-b}Mg_{1-a}Al_{10}O_{17}:Mn_a,Eu_b$ | $(Y_{1-x-y}Gd_xTb_y)Al_3(BO_3)_4$ | | | | |
| Comparative Example 4 | - | - | 100 | 0.327 | 0.612 | 9 |
| Comparative Example 5 | 0 | 100 | 110 | 0.337 | 0.587 | 5.5 |
| Example 3 | 100 | 0 | 95 | 0.137 | 0.626 | 2.6 |
| Example 5 | 80 | 20 | 98 | 0.177 | 0.618 | 3.1 |
| Example 6 | 60 | 40 | 101 | 0.217 | 0.610 | 3.6 |
| Example 7 | 40 | 60 | 104 | 0.257 | 0.603 | 4.0 |
| Example 8 | 20 | 80 | 107 | 0.297 | 0.595 | 4.5 |

FIG. 5

Table 3: Decay time, Color coordinate, and Relative luminance

| | Phosphor composition (weight ratio) | | Relative Luminance (%) | CIE color coordinate | | Decay time (ms) |
|---|---|---|---|---|---|---|
| | First phosphor | Second phosphor | | x | y | |
| | $Ba_{1-b}Mg_{1-a}Al_{10}O_{17}:Mn_a,Eu_b$ | $(Y_{3-x}Ce_x)Al_5O_{12}$ | | | | |
| Comparative Example 4 | - | - | 100 | 0.327 | 0.612 | 9 |
| Comparative Example 6 | 0 | 100 | 76 | 0.411 | 0.557 | 0.5 |
| Example 1 | 100 | 0 | 100 | 0.1347 | 0.6771 | 5 |
| Example 9 | 80 | 20 | 95 | 0.190 | 0.653 | 4.1 |
| Example 10 | 60 | 40 | 90 | 0.245 | 0.629 | 3.2 |
| Example 11 | 40 | 60 | 86 | 0.300 | 0.605 | 2.3 |
| Example 12 | 20 | 80 | 81 | 0.356 | 0.581 | 1.4 |

FIG. 6

Table 4: Decay time, Color coordinate, and Relative luminance

| | Phosphor composition (weight ratio) | | | Relative Luminance (%) | CIE color coordinate | | Decay time (ms) |
|---|---|---|---|---|---|---|---|
| | First phosphor | Second phosphor | | | x | y | |
| | | $(Y_{1-x}Ce_x)Al_5O_{12}$ | $Y_{(1-z)}Gd_zAl_3(BO_3)_4$:Tb | | | | |
| Comparative Example 4 | - | 100 | - | 76 | 0.411 | 0.557 | 0.5 |
| Comparative Example 6 | - | - | 100 | 110 | 0.337 | 0.587 | 5.5 |
| Example 1 | 100 | - | - | 100 | 0.1347 | 0.6771 | 5 |
| Example 1 | 20 | 40 | 40 | 94 | 0.326 | 0.593 | 3.2 |
| Example 1 | 30 | 35 | 35 | 95 | 0.302 | 0.604 | 3.4 |
| Example 1 | 40 | 30 | 30 | 96 | 0.278 | 0.614 | 3.6 |
| Example 1 | 50 | 25 | 25 | 97 | 0.254 | 0.625 | 3.9 |

PHOSPHOR COMPOSITION AND DISPLAY DEVICE INCLUDING THE SAME

BACKGROUND

1. Field

Embodiments relate to a phosphor composition and a display device including the same.

2. Description of the Related Art

A stereoscopic image from a plasma display panel (PDP) may be realized by dividing 1 TV field (16.7 ms) into two subfields, respectively producing left and right stereoscopic images, and then projecting the stereoscopic images to left and right eyes of a user wearing goggles. Optical shutters may be mounted on the left and right sides of the goggles to project the selected stereoscopic image signal to both eyes of the user by connecting the left subfield and the right subfield.

The phosphor layers in the PDP for a stereoscopic image should have a lower decay time than that of a general PDP, because the conventional 1 TV field is divided in half to provide two subfields. Particularly, phosphors having a decay time of more than 4.0 ms may cause a crosstalk phenomenon, e.g., acquiring a left subfield image by the right eye, thereby remarkably deteriorating the resolution and distinction of a stereoscopic image.

A decay time of 5 ms or less may be required for a three dimensional ("3D") PDP. In addition, when the PDP panel is used for a long time, a severe decrease in brightness may occur relative to the red and blue phosphors. Accordingly, a green phosphor having a short decay time may be required in order to realize a stereoscopic image.

SUMMARY

Embodiments are therefore directed to a phosphor composition and a display device including the same, which substantially overcome one or more of the problems due to the limitations and disadvantages of the prior art.

It is therefore a feature of an embodiment to provide a phosphor composition for a green discharge cell having a low decay time.

It is therefore another feature of an embodiment to provide a phosphor composition having excellent color quality characteristics.

It is therefore another feature of an embodiment to provide a phosphor composition having excellent brightness.

It is therefore another feature of an embodiment to provide a display device for displaying a three-dimensional stereoscopic image.

At least one of the above and other features and advantages may be realized by providing a phosphor composition, including a first phosphor represented by Formula 1

$$Ba_{1-b}Mg_{1-a}Al_{10}O_{17}:Mn_a,Eu_b \qquad (1),$$

wherein, a and b satisfy the relations: $0.05 \leq a \leq 0.4$, and $0.006 \leq b \leq 0.05$.

a and b may satisfy the relations: $0.05 \leq a \leq 0.15$, and $0.01 \leq b \leq 0.04$.

a and b may satisfy the relations: $0.05 \leq a \leq 0.12$, and $0.015 \leq b \leq 0.03$.

The first phosphor may have a decay time of about 5 ms or less.

The first phosphor may have a decay time of about 1 ms to about 5 ms.

The first phosphor may have a color coordinate of CIE (x) of about 0.13 to about 0.14 and CIE (y) of about 0.59 to about 0.72.

The first phosphor may have a color coordinate of CIE (x) of about 0.13 to about 0.14 and CIE (y) of about 0.67 to about 0.72.

The phosphor composition may further include a second phosphor represented by at least one of Formulae 2 to 7:

$$Zn_2SiO_4:Mn \qquad (2)$$

$$YBO_3:Tb \qquad (3)$$

$$(Y_{1-x-y}Gd_xTb_y)Al_3(BO_3)_4 \qquad (4)$$

wherein x and y satisfy the relations: $0 \leq x \leq 1$, $0 \leq y \leq 1$, and $0 < x+y < 1$, $$Zn(Ga_{1-z}Al_z)_2O_4:Mn \qquad (5)$$

wherein z satisfies the relation: $0 \leq z \leq 1$, $$Li_2Zn(Ge,\theta)_vO_8:Mn \qquad (6)$$

wherein θ includes Al or Ga, and v satisfies the relation: $3 \leq v \leq 4$, $$(Y_{3-w}Ce_w)Al_5O_2 \qquad (7)$$

wherein w satisfies the relation: $0 \leq w \leq 3$.

The first phosphor and the second phosphor may be included in a weight ratio of about 80:20 to about 20:80.

The first phosphor and the second phosphor may be included in a weight ratio of about 80:20 to about 50:50.

At least one of the above and other features and advantages may also be realized by providing a display device, including a display unit including a first phosphor represented by Formula 1:

$$Ba_{1-b}Mg_{1-a}Al_{10}O_{17}:Mn_a,Eu_b \qquad (1),$$

wherein, a and b satisfy the relations: $0.05 \leq a \leq 0.4$, and $0.006 \leq b < 0.05$.

a and b may satisfy the relations: $0.05 \leq a \leq 0.15$, and $0.01 \leq b \leq 0.04$.

a and b may satisfy the relations: $0.05 \leq a \leq 0.12$, and $0.015 \leq b \leq 0.03$.

The first phosphor may have a decay time of about 5 ms or less.

The first phosphor may have a decay time of about 1 ms to about 5 ms.

The first phosphor may have a color coordinate CIE (x) of about 0.13 to about 0.14 and CIE (y) of about 0.59 to about 0.72.

The display device may further include a second phosphor represented by at least one of Formulae 2 to 7:

$$Zn_2SiO_4:Mn \qquad (2)$$

$$YBO_3:Tb \qquad (3)$$

$$(Y_{1-x-y}Gd_xTb_y)Al_3(BO_3)_4 \qquad (4)$$

wherein x and y satisfy the relations: $0 \leq x \leq 1$, $0 \leq y \leq 1$, and $0 < x+y < 1$, $$Zn(Ga_{1-z}Al_z)_2O_4:Mn \qquad (5)$$

wherein z satisfies the relations $0 \leq z \leq 1$, $$Li_2Zn(Ge,\theta)_vO_8:Mn \qquad (6)$$

wherein θ includes Al or Ga, and v satisfies the relation: $3 \leq v \leq 4$, $$(Y_{3-w}Ce_w)Al_5O_{12} \qquad (7)$$

wherein w satisfies the relation: $0 \leq w \leq 3$.

The first phosphor and the second phosphor may be included in a weight ratio of about 80:20 to about 20:80.

The display device may include a device for realizing a three-dimensional stereoscopic image.

The display device may be driven at a rate of about 60 Hz or more.

BRIEF DESCRIPTION OF THE DRAWINGS

The above and other features and advantages will become more apparent to those of ordinary skill in the art by describing in detail exemplary embodiments thereof with reference to the attached drawings, in which.

DETAILED DESCRIPTION

Korean Patent Application No. 10-2008-0011857, filed on Feb. 5, 2008, in the Korean Intellectual Property Office, and entitled: "Phosphor Composition for Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a co-dopant" may represent a single compound, e.g., dysprosium, or multiple compounds in combination, e.g., dysprosium mixed with terbium.

As used herein, the term "decay time" means the time for decreasing optical volume expressed from a phosphor to ¹⁄₁₀ of the initial optical volume.

Embodiments relate to a phosphor composition suitable for a display device. Additionally, embodiments relate to a display device that is capable of realizing a 3D stereoscopic image. Specifically, embodiments relate to a green phosphor composition, which requires a shorter decay time than red and blue phosphors because green has high luminance and a wavelength that is easily acquired by the naked eye. The display device may include any suitable display device, e.g., a PDP. According to another embodiment, the phosphor composition may be used in a plasma display device having an excitation source of vacuum ultraviolet (VUV) ray.

$BaMgAl_{10}O_{17}$:Mn has excellent color purity but low luminance and long decay time. Embodiments provide a new phosphor prepared by adding europium (Eu) to $BaMgAl_{10}O_{17}$:Mn phosphor, shortening decay time as well as providing excellent luminance and color purity.

According to an embodiment, a phosphor composition may include a first phosphor represented by Formula 1:

$$Ba_{1-b}Mg_{1-a}Al_{10}O_{17}:Mn_a,Eu_b \quad (1).$$

In Formula 1, a and b may satisfy the relations: $0.05 \leq a \leq 0.4$ and $0.006 \leq b < 0.05$. Preferably, a and b satisfy the relations: $0.05 \leq a \leq 0.15$ and $0.01 \leq b \leq 0.04$. More preferably, a and b satisfy the relations: $0.05 \leq a \leq 0.12$ and $0.015 \leq b \leq 0.03$. Maintaining a at about 0.05 or greater may help ensure that luminous efficiency does not decrease. Maintaining a at about 0.4 or less may help ensure not only that luminous efficiency does not decrease, but color purity may be maintained, and phosphor life may not be reduced. Maintaining b at about 0.006 or greater may help ensure sufficiently low decay time. Maintaining b at about 0.05 or less may help ensure that color purity is not reduced.

According to another embodiment, a phosphor composition may include a first phosphor represented by Formula 1 and may further include a second phosphor represented by at least one of Formulae 2 to 7:

$$Zn_2SiO_4:Mn \quad (2)$$

$$YBO_3:Tb \quad (3)$$

$$(Y_{1-x-y}Gd_xTb_y)Al_3(BO_3)_4 \quad (4)$$

wherein x and y satisfy the relations: $0 \leq x \leq 1$, $0 \leq y \leq 1$, and $0 < x+y < 1$, $$Zn(Ga_{1-z}Al_z)_2O_4:Mn \quad (5)$$

wherein z satisfies the relation: $0 \leq z \leq 1$, $$Li_2Zn(Ge,\theta)_vO_8:Mn \quad (6)$$

wherein, θ includes Al or Ga, and v satisfies the relation: $3 \leq v \leq 4$, $$(Y_{3-w}Ce_w)Al_5O_{12} \quad (7)$$

wherein w satisfies the relation: $0 \leq w \leq 3$.

In addition, the second phosphor may include any suitable green phosphor, other than phosphors represented by Formulae 2 to 7, as long as the phosphor is able to maintain luminance characteristics and improve green color coordinate characteristics. The other suitable green phosphors may be used together with phosphors represented by Formulae 2 to 7.

According to an embodiment, the first and second phosphors may be included in a weight ratio of about 80:20 to about 20:80. Preferably, the ratio is about 80:20 to about 50:50. Maintaining the weight ratio of the first and second phosphors at about 80:20 to about 20:80 may help improve green color coordinate characteristics while maintaining luminance characteristics, so that overall color quality may be improved.

The phosphor composition according to an embodiment may have excellent luminance and color coordinate characteristics, as well as a short decay time. The phosphor composition may be used in a display device, e.g., a PDP. Particularly, the phosphor composition may be used in a display device capable of being driven at a high speed of, e.g., 60 Hz, 120 Hz, or higher, or in a device for displaying 3D stereoscopic images. The phosphor represented by Formula 1 may have a decay time of about 5 ms or less. Preferably, the decay time is about 1 to about 5 ms.

The phosphor represented by Formula 1 may have a color coordinate of CIE (x) of about 0.13 to about 0.14 and CIE (y) of about 0.59 to about 0.72. This may indicate excellent green color coordinate characteristic. Preferably, the phosphor represented by Formula 1 has a color coordinate of CIE (x) of about 0.13 to about 0.14 and CIE (y) of about 0.67 to about 0.72. In another embodiment, the phosphor composition including a phosphor represented by Formula 1 may have a color coordinate of CIE (x) of about 0.17 to about 0.36 and CIE (y) of about 0.58 to about 0.66, which may also indicate an excellent green color coordinate characteristic.

According to another embodiment, provided is a display device including the phosphor composition of an embodiment. The display device may have an excitation source of VUV rays and, particularly, may include, e.g., a PDP. According to an embodiment, the phosphor composition may be used in a display device capable of being driven at a high speed of, e.g., 60 Hz, 120 Hz, or higher, or in a device for displaying a 3D stereoscopic image.

Figure 1:
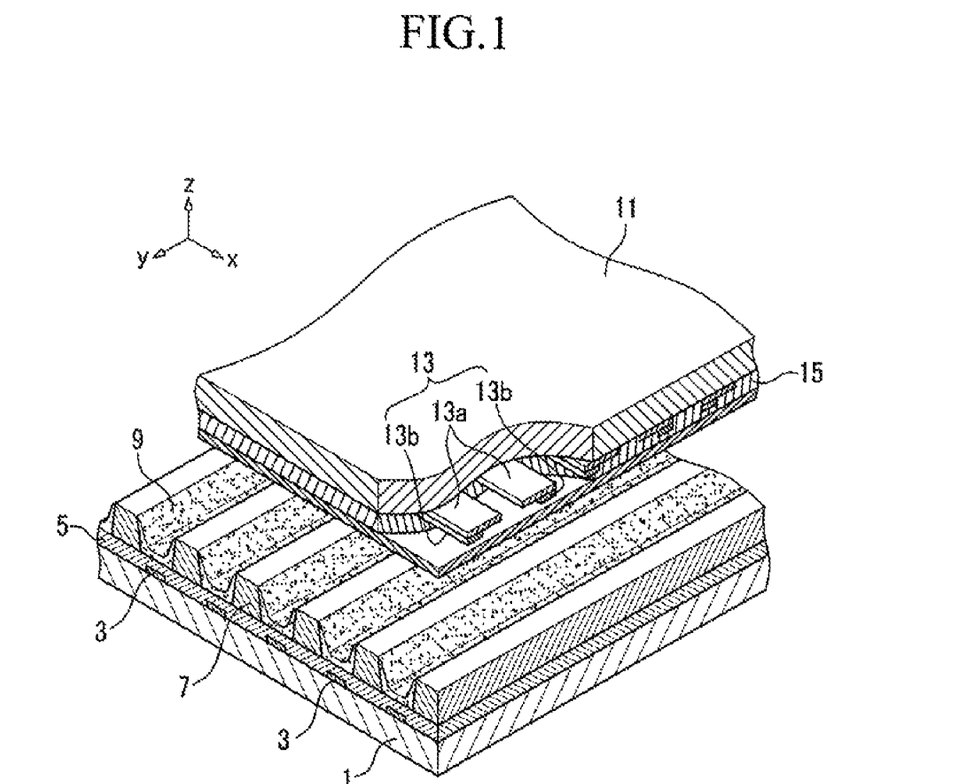
FIG. 1 illustrates a partial exploded perspective view of a plasma display panel according to an embodiment.

According to an embodiment, a PDP may include the green phosphor of an embodiment. FIG. 1 illustrates a partial exploded perspective view of a PDP according to an embodiment. However, the green phosphor of an embodiment is not limited to use in a PDP with a structure illustrated in FIG. 1, and may be used in various PDPs.

As shown in FIG. 1, the PDP may include a first substrate (rear substrate) 1 and a second substrate (front substrate) 11 that are disposed substantially in parallel with each other with a predetermined distance therebetween.

On the surface of the first substrate 1, a plurality of address electrodes 3 may be disposed in one direction (the Y direction in the drawing), and a first dielectric layer 5 may be disposed covering the address electrodes 3. A plurality of barrier ribs 7 may be formed on the first dielectric layer 5 between the address electrodes 3 at a predetermined height to form a discharge space.

The barrier ribs 7 may be formed in any suitable shape as long as the barrier ribs 7 partition the discharge space. The barrier ribs 7 may have diverse patterns. For example, the barrier ribs 7 may be formed as an open-type, e.g., a stripe, or as a closed type, e.g., a waffle, a matrix, or a delta shape. Also, the closed-type barrier ribs may be formed such that a horizontal cross-section of the discharge space may be a polygon, e.g., a quadrangle, a triangle, or a pentagon, or a circle or an oval. Red (R), green (G), and blue (B) phosphor layers 9 may be disposed in discharge cells formed between the barrier ribs 7.

Display electrodes 13, each including a transparent electrode 13a and a bus electrode 13b, may be disposed in a direction crossing the address electrodes 3 (X direction in the drawing) on one surface of the second substrate 11 facing the first substrate 1. Also, a dielectric layer 15 may be disposed on the surface of the second substrate 11 while covering the display electrodes 13.

Discharge cells may be formed at positions where the address electrodes 3 of the first substrate 1 cross the display electrodes 13 of the second substrate 11. The discharge cells may be filled with a discharge gas.

With the above-described structure, address discharge may be achieved by applying an address voltage (Va) to a space between the address electrodes 3 and any one display electrode 13. When a sustain voltage (Vs) is applied to a space between a pair of display electrodes 13, an excitation source generated from the sustain discharge may excite a corresponding phosphor layer 9 to thereby emit visible light through the transparent second substrate 11. The excitation source may include VUV rays.

The following examples illustrate embodiments in more detail. The following examples are not more than specific examples, and the scope is not limited by the Examples.

Example 1

Barium carbonate, magnesium oxide, alumina, manganese carbonate, and europium oxide were mixed according to a stoichiometric ratio. Then, 0.1 wt % of a $MgF_2$ flux was added. 100 g of the resulting mixture was put in a 300 cc alumina crucible and fired at 1500° C. for 2 hours under a reduction atmosphere. Then, the mixture was ground with a ball mill for 5 hours, washed, dried, and sieved, to prepare a $Ba_{1-b}Mg_{1-a}Al_{10}O_{17}:Mn_a,Eu_b$ (a=0.08 and b=0.015) phosphor.

Examples 2 to 4 and Comparative Examples 1 to 3

Figure 3:
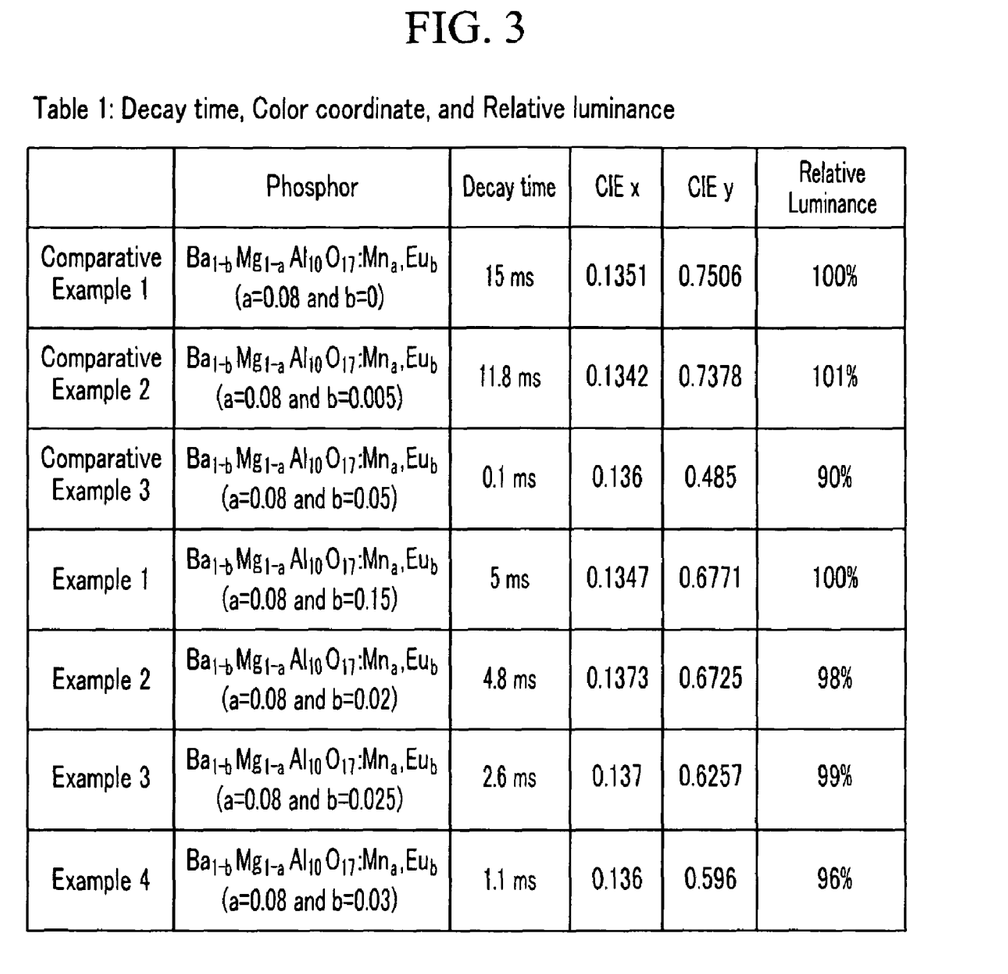
FIG. 3. illustrates Table 1, showing the Decay time, Color coordinate, and Relative luminance of Examples 1 to 4 and Comparative Examples 1 to 3.

A phosphor was prepared according to the same method as Example 1 except for mixing barium carbonate, magnesium oxide, alumina, manganese carbonate, and europium oxide according to a stoichiometric ratio to prepare a phosphor with a composition shown in Table 1 of FIG. 3.

Phosphors obtained from Examples 1 to 4 and Comparative Examples 1 to 3 were measured for their decay time, color coordinate (CIE x and y), and relative luminance. The results are shown in Table 1. The relative luminance was determined as a relative value to that of Comparative Example 1, considering the relative luminance of Comparative Example 1 to be 100%.

As shown in Table 1, the phosphor compositions including 0.005 or less of b (the amount of Eu) according to Comparative Examples 1 and 2 had good luminance characteristics, but decay times of 10 ms or longer. However, the phosphor compositions including 0.006 or more of b (the amount of Eu) according to Examples 1 to 4 had excellent luminance characteristics and color coordinate characteristic, as well as decay times of 5.0 ms or shorter. In addition, the phosphor composition including 0.05 or more of b (the amount of Eu) according to Comparative Example 3 had poor color coordinate characteristic and therefore may not be useful as a green phosphor.

The phosphors according to Examples 1 to 4 were examined regarding their fluorescent spectrum (exciting wavelength: 147 nm). The results are shown in FIG. 2.

Figure 2:
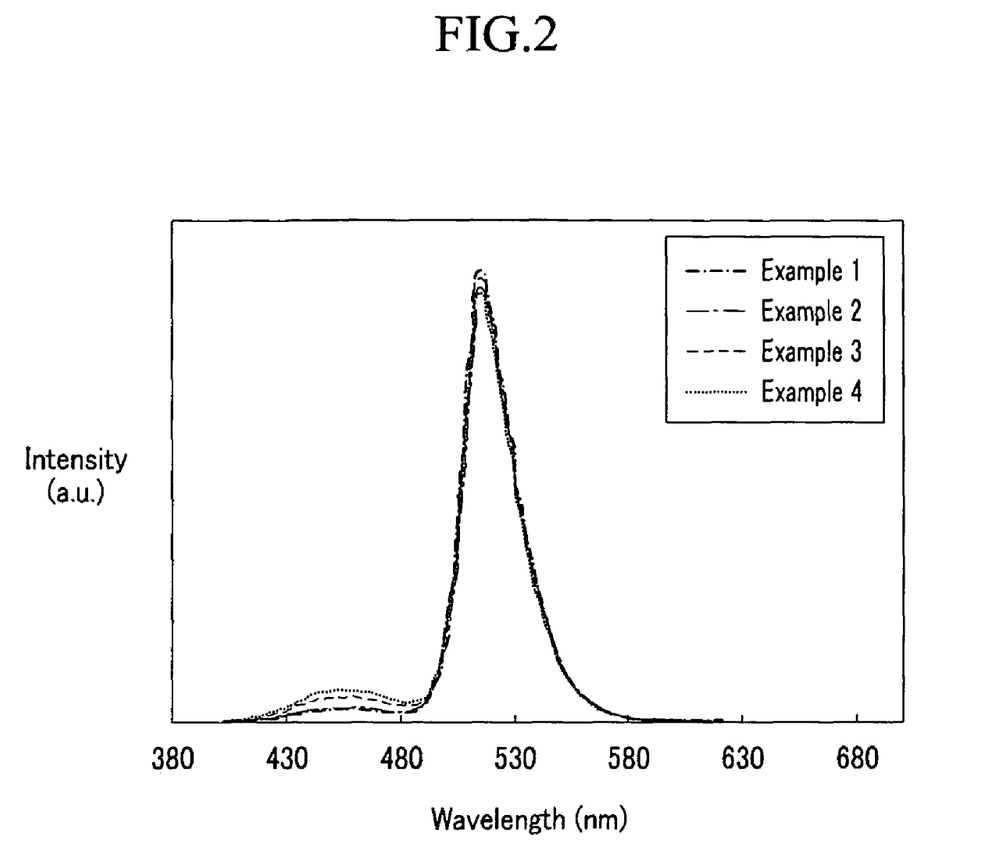
FIG. 2 illustrates a graph showing the fluorescent spectra of the phosphors according to Examples 1 to 4.

FIG. 2 illustrates a graph showing fluorescent spectrum results of the phosphors according to Examples 1 to 4. As shown in FIG. 2, the phosphors of Examples 1 to 4 may be useful for a PDP, since they emit the most light around 480 to 590 nm, and weakly emit light around 450 nm.

Examples 5 to 8 and Comparative Examples 4 and 5

Figure 4:
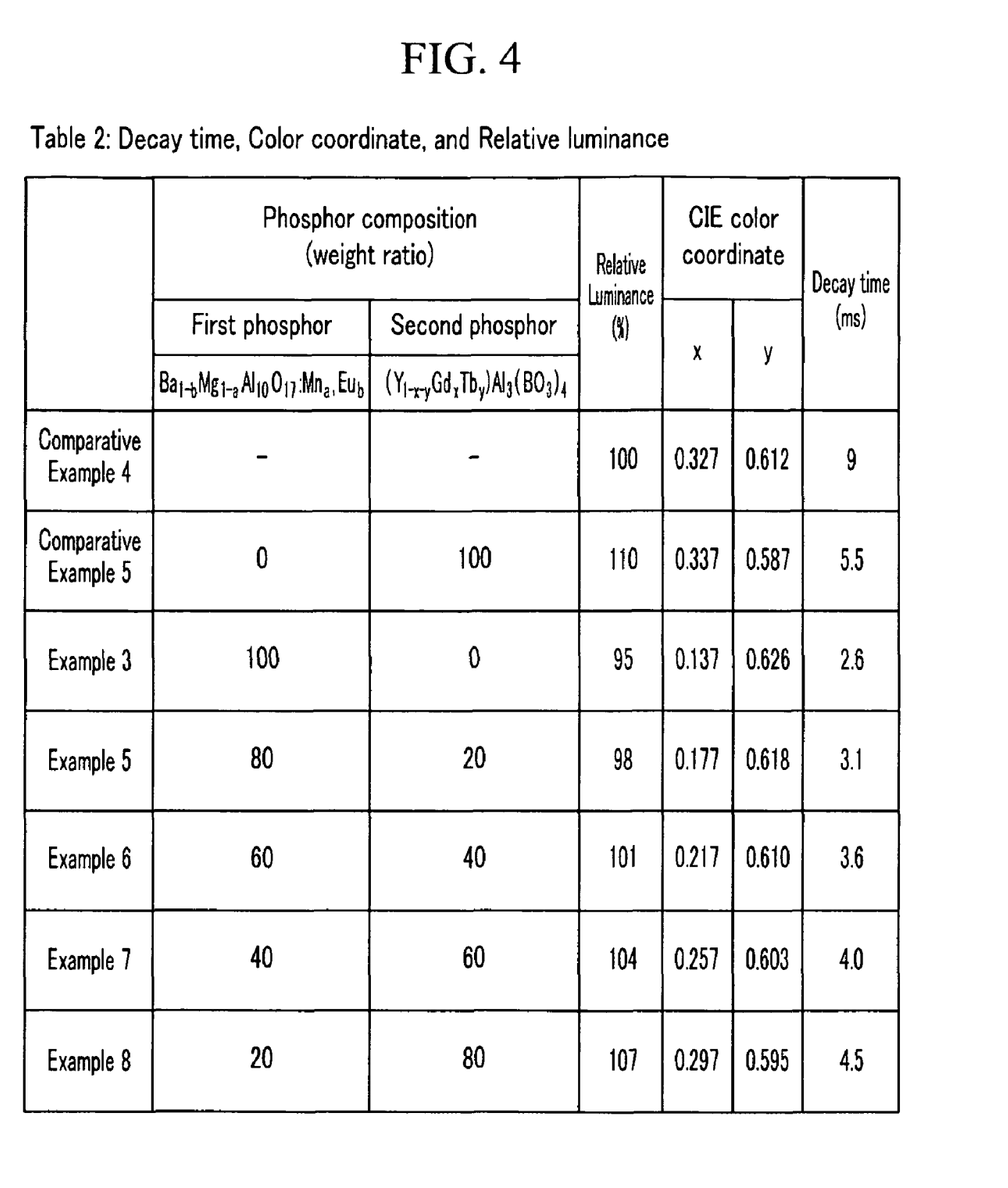
FIG. 4. illustrates Table 2, showing the Decay time, Color coordinate, and Relative luminance of Examples 3 and 5 to 8, and Comparative Examples 4 and 5.

A phosphor composition was prepared by mixing a first phosphor, $Ba_{1-b}Mg_{1-a}Al_{10}O_{17}:Mn_a,Eu_b$ (a=0.08 and b=0.025), according to Example 3 with a second phosphor, $(Y_{1-x-y}Gd_xTb_y)Al_3(BO_3)_4$ (x=0.2 and y=0.2), in various ratios, as shown in Table 2 of FIG. 4.

$YBO_3:Tb$ was used as a phosphor composition of Comparative Example 4. $(Y_{1-x-y}Gd_xTb_y)Al_3(BO_3)_4$ was used as a phosphor composition of Comparative Example 5.

The phosphor compositions according to Examples 5 to 8 and Comparative Examples 4 and 5 were measured for their relative luminance, color coordinate, and decay time according to the same method described above. The results are shown in Table 2.

The relative luminance was the relative value compared to the luminance of the phosphor when only $YBO_3:Tb$ according to Comparative Example 4 was used. The luminance of $YBO_3:Tb$ was considered to be 100%. As shown in Table 2, when a phosphor composition of an embodiment was mixed with a $(Y_{1-x-y}Gd_xTb_y)Al_3(BO_3)_4$ phosphor having excellent luminance characteristics, the resulting phosphor had excellent luminance characteristics as well as a short decay time, as required for a PDP displaying 3D stereoscopic images.

Examples 9 to 12 and Comparative Example 6

Figure 5:
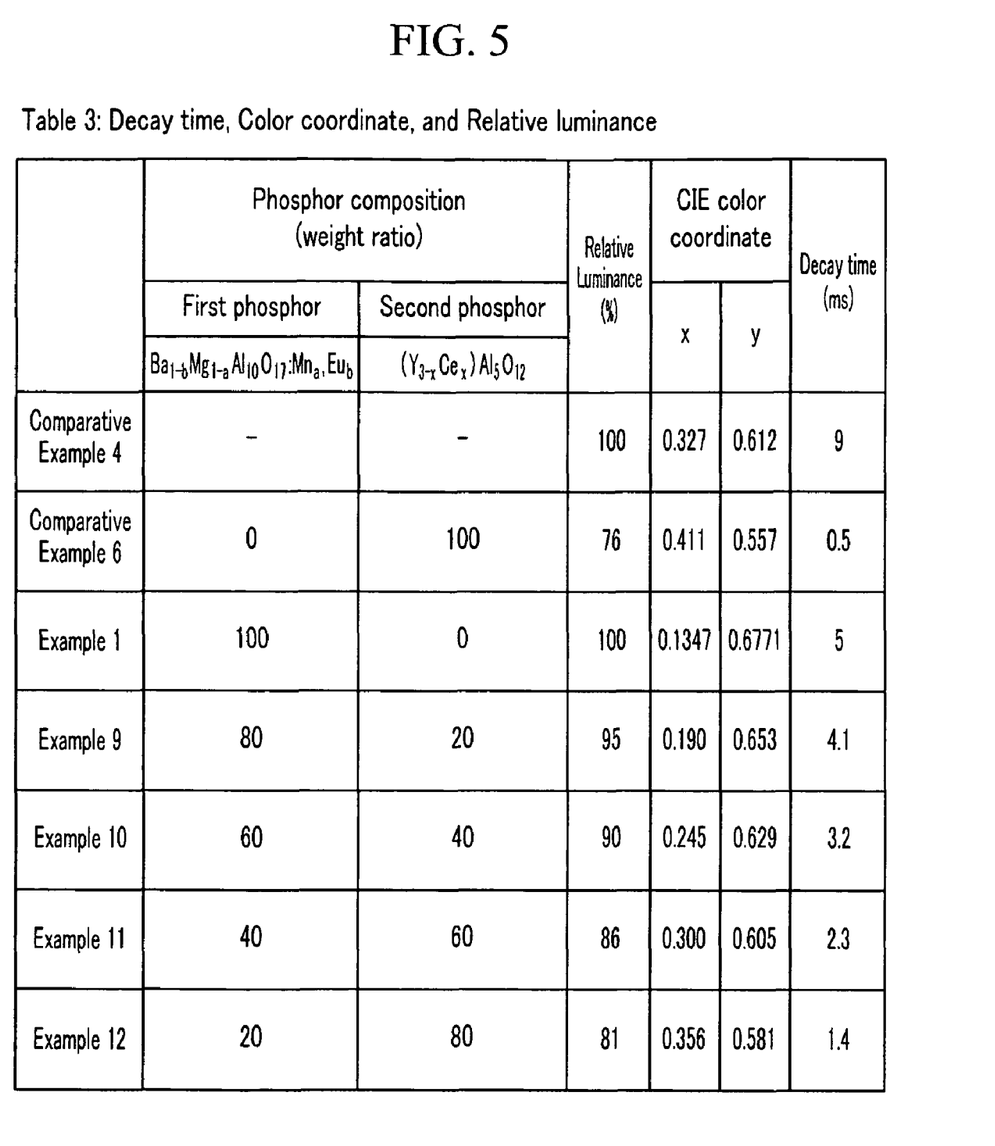
FIG. 5. illustrates Table 3, showing the Decay time, Color coordinate, and Relative luminance of Examples 1 and 9 to 12, and Comparative Examples 4 and 6.

A phosphor composition was prepared by mixing the first phosphor of Example 1, $Ba_{1-b}Mg_{1-a}Al_{10}O_{17}:Mn_a,Eu_b$ (a=0.08 and b=0.015) with a second phosphor, $(Y_{3-x}Ce_x)Al_5O_{12}$ (x=0.03), in various ratios, as shown in Table 3 of FIG. 5. The phosphor compositions were measured for their relative luminance, color coordinate, and decay time according to the same method described above. The results are shown in Table 3. The relative luminance was the relative value compared to the luminance of the phosphor when only $YBO_3:Tb$ according to Comparative Example 4 was used. The luminance of $YBO_3:Tb$ was considered to be 100%.

As shown in Table 3, when a phosphor composition of an embodiment was mixed with a $(Y_{3-x}Ce_x)Al_5O_{12}$ phosphor, having excellent luminance and short decay time characteristics. The resulting phosphor had excellent luminance and color purity, as well as a short decay time, as required for a PDP displaying stereoscopic images.

Examples 13 to 16 and Comparative Example 7

Figure 6:
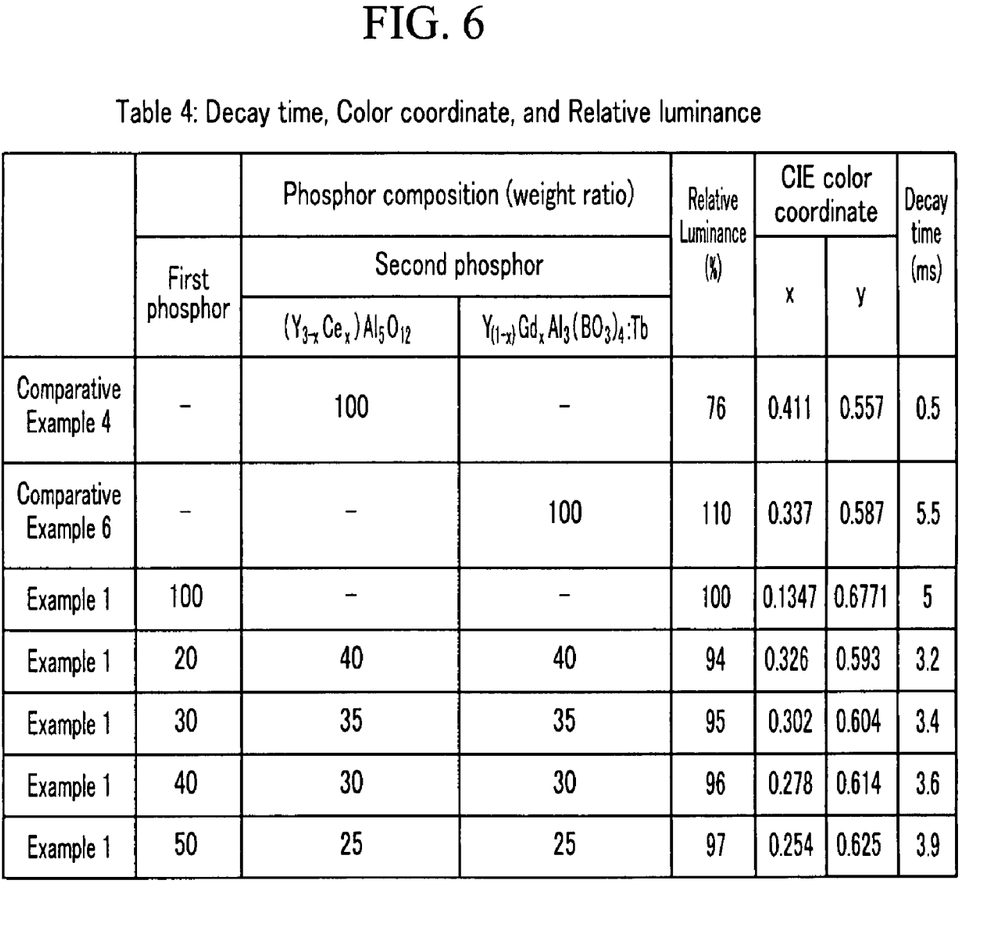
FIG. 6. illustrates Table 4, showing the Decay time, Color coordinate, and Relative luminance of Examples 1 and 13 to 16, and Comparative Examples 6 and 7.

A phosphor composition was prepared by mixing the $Ba_{1-b}Mg_{1-a}Al_{10}O_{17}:Mn_a,Eu_b$ (a=0.08 and b=0.015) first phosphor of Example 1 with a second phosphor prepared by mixing $(Y_{3-x}Ce_x)Al_5O_{12}$ (x=0.03) of Comparative Example 6 and $Y_{(1-x)}Gd_xAl_3(BO_3)_4:Tb$ (x=0.2 and y=0.2) of Comparative Example 7 in various ratios as shown Table 4 of FIG. 6.

The phosphor compositions were measured for their relative luminance, color coordinate, and decay time according to the same method described above. The results are shown in Table 4.

The relative luminance was the relative value compared to the luminance of the phosphor when only $Ba_{1-b}Mg_{1-a}Al_{10}O_{17}:Mn_a,Eu_b$ (a=0.08 and b=0.015) of Example 1 was used. The luminance of $Ba_{1-b}Mg_{1-a}Al_{10}O_{17}:Mn_a,Eu_b$ (a=0.08 and b=0.015) was considered to be 100%.

As shown in Table 4, when the conventional $Y_{(1-x)}Gd_xAl_3(BO_3)_4:Tb$ (x=0.2 and y=0.2) phosphor (Comparative Example 7) was used on its own, it exhibited a good relative luminance and decay time, but poor color coordinate characteristic. When $Y_{(1-x)}Gd_xAl_3(BO_3)_4:Tb$ (x=0.2 and y=0.2) is mixed with $(Y_{3-x}Ce_x)Al_5O_{12}$ (x=0.03), which has a short decay time, the resulting phosphor exhibited a decay time of less than 5 ms, as well as excellent luminance and color purity.

A green phosphor having a short decay time and good brightness may be useful for the next generation virtual three-dimensional stereoscopic multimedia, which may be applied to fields of, e.g., telecommunications, broadcasting, medical, education, training, military, games, animation, virtual reality, CAD, industrial technology, and so on.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A phosphor composition, comprising:
a first phosphor represented by Formula 1:

$$Ba_{1-b}Mg_{1-a}Al_{10}O_{17}:Mn_a,Eu_b \qquad (1)$$

wherein, a and b satisfy the relations: $0.05 \leq a \leq 0.4$, and $0.006 \leq b < 0.05$; and a second phosphor represented by at least one of Formulae 2 to 7:

$$Zn_2SiO_4:Mn \qquad (2)$$

$$YBO_3:Tb \qquad (3)$$

$$(Y_{1-x-y}Gd_xTb_y)Al_3(BO_3)_4 \qquad (4)$$

wherein x and y satisfy the relations: $0 \leq x \leq 1$, $0 \leq y \leq 1$, and $0 < x+y < 1$, $$Zn(Ga_{1-z}Al_z)_2O_4:Mn \qquad (5)$$

wherein z satisfies the relation: $0 \leq z \leq 1$, $$Li_2Zn(Ge,\theta)_vO_8:Mn \qquad (6)$$

wherein θ includes Al or Ga, and v satisfies the relation: $3 \leq v \leq 4$, $$(Y_{3-w}Ce_w)Al_5O_{12} \qquad (7)$$

wherein w satisfies the relation: $0 \leq w \leq 3$.

2. The phosphor composition as claimed in claim 1, wherein a and b satisfy the relations: $0.05 \leq a \leq 0.15$, and $0.01 \leq b \leq 0.04$.

3. The phosphor composition as claimed in claim 2, wherein a and b satisfy the relations: $0.05 \leq a \leq 0.12$, and $0.015 \leq b \leq 0.03$.

4. The phosphor composition as claimed in claim 1, wherein the first phosphor has a decay time of about 5 ms or less.

5. The phosphor composition as claimed in claim 4, wherein the first phosphor has a decay time of about 1 ms to about 5 ms.

6. The phosphor composition as claimed in claim 1, wherein the first phosphor has a color coordinate of CIE (x) of about 0.13 to about 0.14 and CIE (y) of about 0.59 to about 0.72.

7. The phosphor composition as claimed in claim 6, wherein the first phosphor has a color coordinate of CIE (x) of about 0.13 to about 0.14 and CIE (y) of about 0.67 to about 0.72.

8. The phosphor composition as claimed in claim 1, wherein the first phosphor and the second phosphor are included in a weight ratio of about 80:20 to about 20:80.

9. The phosphor composition as claimed in claim 8, wherein the first phosphor and the second phosphor are included in a weight ratio of about 80:20 to about 50:50.

10. A display device, comprising:
a display unit including a first phosphor represented by Formula 1 and a second phosphor represented by at least one of Formulae 2 to 7:

$$Ba_{1-b}Mg_{1-a}Al_{10}O_{17}:Mn_a,Eu_b \quad (1)$$

wherein, a and b satisfy the relations: $0.05 \leq a \leq 0.4$, and $0.006 \leq b < 0.05$, $$Zn_2SiO_4:Mn \quad (2)$$

$$YBO_3:Tb \quad (3)$$

$$(Y_{1-x-y}Gd_xTb_y)Al_3(BO_3)_4 \quad (4)$$

wherein x and y satisfy the relations: $0 \leq x \leq 1$, $0 \leq y \leq 1$, and $0 < x+y < 1$, $$Zn(Ga_{1-z}Al_z)_2O_4:Mn \quad (5)$$

wherein z satisfies the relation: $0 \leq z \leq 1$, $$Li_2Zn(Ge,\theta)_vO_8:Mn \quad (6)$$

wherein θ includes Al or Ga, and v satisfies the relation: $3 \leq v \leq 4$, $$(Y_{3-w}Ce_w)Al_5O_{12} \quad (7)$$

wherein w satisfies the relation: $0 \leq w \leq 3$.

11. The display device as claimed in claim 10, wherein a and b satisfy the relations: $0.05 \leq a \leq 0.15$, and $0.01 \leq b \leq 0.04$.

12. The display device as claimed in claim 11, wherein a and b satisfy the relations: $0.05 \leq a \leq 0.12$, and $0.015 \leq b \leq 0.03$.

13. The display device as claimed in claim 10, wherein the first phosphor has a decay time of about 5 ms or less.

14. The display device as claimed in claim 13, wherein the first phosphor has a decay time of about 1 ms to about 5 ms.

15. The display device as claimed in claim 10, wherein the first phosphor has a color coordinate CIE (x) of about 0.13 to about 0.14 and CIE (y) of about 0.59 to about 0.72.

16. The display device as claimed in claim 10, wherein the first phosphor and the second phosphor are included in a weight ratio of about 80:20 to about 20:80.

17. The display device as claimed in claim 10, wherein the display device includes a device for realizing a three-dimensional stereoscopic image.

18. The display device as claimed in claim 10, wherein the display device is driven at a rate of about 60 Hz or more.

19. A display device, comprising:
a display unit including a first phosphor represented by Formula 1:

$$Ba_{1-b}Mg_{1-a}Al_{10}O_{17}:Mn_a,Eu_b \quad (1)$$

wherein, a and b satisfy the relations: $0.05 \leq a \leq 0.4$, and $0.006 \leq b < 0.05$, and wherein the display device is driven at a rate of about 60 Hz or more.

* * * * *